(12) United States Patent
Matsuda et al.

(10) Patent No.: US 12,208,462 B2
(45) Date of Patent: Jan. 28, 2025

(54) STEEL SHEET ASSEMBLY, METHOD OF MANUFACTURING STEEL SHEET ASSEMBLY, AND SPOT WELDING PROCESS

(71) Applicant: JFE Steel Corporation, Tokyo (JP)

(72) Inventors: Hiroshi Matsuda, Tokyo (JP); Yasuaki Okita, Tokyo (JP); Muneo Matsushita, Tokyo (JP); Rinsei Ikeda, Tokyo (JP); Kenji Oi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 931 days.

(21) Appl. No.: 17/319,134

(22) Filed: May 13, 2021

(65) Prior Publication Data

US 2021/0260685 A1 Aug. 26, 2021

Related U.S. Application Data

(62) Division of application No. 15/545,757, filed as application No. PCT/JP2016/000328 on Jan. 22, 2016, now abandoned.

(30) Foreign Application Priority Data

Feb. 2, 2015 (JP) .................................. 2015-018099

(51) Int. Cl.
| | |
|---|---|
| B23K 11/16 | (2006.01) |
| B23K 1/20 | (2006.01) |
| B23K 11/11 | (2006.01) |
| B23K 11/30 | (2006.01) |
| B23K 11/34 | (2006.01) |
| B23K 35/00 | (2006.01) |
| B23K 35/02 | (2006.01) |
| B23K 103/04 | (2006.01) |
| B32B 15/04 | (2006.01) |
| C22C 38/00 | (2006.01) |
| C22C 38/02 | (2006.01) |
| C22C 38/04 | (2006.01) |
| C22C 38/06 | (2006.01) |
| C22C 38/12 | (2006.01) |
| C22C 38/18 | (2006.01) |
| C22C 38/60 | (2006.01) |
| H05B 3/03 | (2006.01) |

(52) U.S. Cl.
CPC .............. *B23K 11/163* (2013.01); *B23K 1/20* (2013.01); *B23K 11/11* (2013.01); *B23K 11/16* (2013.01); *B23K 11/30* (2013.01); *B23K 11/34* (2013.01); *B23K 35/004* (2013.01); *B32B 15/04* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/18* (2013.01); *C22C 38/60* (2013.01); *H05B 3/03* (2013.01); *B23K 35/0205* (2013.01); *B23K 2103/04* (2018.08); *C22C 38/12* (2013.01)

(58) Field of Classification Search
CPC ......... B23K 11/163; B23K 1/20; B23K 11/11; B23K 11/16; B23K 11/30; B23K 11/34; B23K 35/004; B23K 2103/04; B23K 35/0205; B32B 15/04; C22C 38/00; C22C 38/001; C22C 38/002; C22C 38/02; C22C 38/04; C22C 38/06; C22C 38/18; C22C 38/60; C22C 38/12; H05B 3/03
See application file for complete search history.

(56) References Cited

U.S. PATENT DOCUMENTS

| | | | | |
|---|---|---|---|---|
| 4,482,600 | A | * 11/1984 | Matsumoto | ............. B32B 15/08 |
| | | | | 428/458 |
| 4,591,687 | A | * 5/1986 | Urech | ................ B23K 35/0205 |
| | | | | 219/93 |
| 4,707,397 | A | 11/1987 | Morimura et al. | |
| 7,392,929 | B1 | 7/2008 | Finerman et al. | |
| 2006/0081563 | A1* | 4/2006 | Ueda | .................. B23K 11/3081 |
| | | | | 219/119 |
| 2011/0073572 | A1 | 3/2011 | Wang et al. | |
| 2012/0141829 | A1 | 6/2012 | Oikawa et al. | |

(Continued)

FOREIGN PATENT DOCUMENTS

| | | |
|---|---|---|
| CN | 102186666 A | 9/2011 |
| CN | 102581459 A | 7/2012 |
| CN | 102794557 A | 11/2012 |

(Continued)

OTHER PUBLICATIONS

MatWeb Meta/ Material Data Sheets © 2017 MatWeb, LLC. (Year: 2017).*
UNS Numbers Assigned to Date With description of each material covered and references to documents in which the same or similar materials are described Gxxxxx Number Series AISI and SAE Carbon and Alloy Steels (Year: 2017).*
UNS Numbers Assigned to Date With description of each material covered and references to documents in which the same or similar materials are described Hxxxxx Number Series AISI and SAE Carbon and Alloy Steels (Year: 2017).*
AZO materials AISI 4142H Alloy Steel (UNS H41420)—https://www.azom.com/article.aspx?ArticleID=9164 (Year: 2013).*
https://www.azom.com/article.aspx?ArticleID=9164 (Year: 2013).*
Gxxxxx Number Series AISI and SAE Carbon and Alloy Steels, 2008 (Year: 2008).

(Continued)

*Primary Examiner* — Helena Kosanovic
*Assistant Examiner* — Keith Brian Assante
(74) *Attorney, Agent, or Firm* — DLA Piper LLP (US)

(57) ABSTRACT

A welding process used in a method of manufacturing a steel sheet assembly includes spot welding steel sheets performed for a heat time of 0.08 seconds or more using a convex electrode with a tip radius of curvature of 20 mm or more or a flat electrode such that the weld force F (kN) for initial 0.03 seconds of the heat time satisfies formula: $F<0.00125\times(1+0.75\times t_{all})+3$ where TS (MPa) denotes an average strength of the steel sheets and represents a weighted mean value of a thickness of each of the steel sheets, and $t_{all}$ (mm) denotes a total thickness of the steel sheets (the sum of the thicknesses of the steel sheets).

8 Claims, No Drawings

(56) References Cited

U.S. PATENT DOCUMENTS

| | | | | |
|---|---|---|---|---|
| 2015/0001188 A1* | 1/2015 | Oikawa | ............... | B23K 11/115 219/91.22 |
| 2017/0157706 A1* | 6/2017 | Hirano | ............... | C21D 6/008 |

FOREIGN PATENT DOCUMENTS

| EP | 0 089 435 | A2 | 9/1983 |
|---|---|---|---|
| EP | 0 414 030 | A2 | 2/1991 |
| JP | 04-219231 | A | 8/1992 |
| JP | 06-7948 | A | 1/1994 |
| JP | 08-118031 | A | 5/1996 |
| JP | 08-206845 | A | 8/1996 |
| JP | 2003-010976 | A | 1/2003 |
| JP | 2012-157888 | A | 8/2012 |
| JP | 5043236 | B2 | 10/2012 |
| JP | 2013-027890 | A | 2/2013 |
| JP | 2013-35063 | A | 2/2013 |
| JP | 2014-29021 | A | 2/2014 |
| KR | 10-2012-0104039 | A | 9/2012 |
| WO | 2010/021899 | A1 | 2/2010 |

OTHER PUBLICATIONS

Azom, AISI 4142H Alloy Steel (UNS H41420), Jun. 20, 2013 (Year: 2013).

Hxxxxx Number Series AISI and SAE H-Steels, 2017 (Year: 2017).

MatWeb Metal Material Data Sheets, 2017 (Year: 2017).

Supplementary European Search Report dated Feb. 2, 2018 of counterpart European Application No. 16746280.3.

Korean Office Action dated Jul. 19, 2018 of counterpart Korean Appln. No. 2017-7020691 with a Concise Statement of Relevance in English.

Chinese Office Action dated Nov. 30, 2018 of counterpart Chinese Application No. 201680008237.1 with a Search Report in English.

* cited by examiner

STEEL SHEET ASSEMBLY, METHOD OF MANUFACTURING STEEL SHEET ASSEMBLY, AND SPOT WELDING PROCESS

RELATED APPLICATION

This is a divisional of U.S. Ser. No. 15/545,757, filed Jul. 24, 2017, which is a § 371 of International Application No. PCT/JP2016/000328, with an international filing date of Jan. 22, 2016, which is based on Japanese Patent Application No. 2015-018099, filed Feb. 2, 2015, the subject matter of which is incorporated by reference.

TECHNICAL FIELD

This disclosure relates to a steel sheet assembly obtained by joining a plurality of steel sheets by a joining method using a combination of an adhesive and welding, having excellent performance including high strength, high rigidity and the like and also relates to a method of joining the same.

BACKGROUND

In recent years, as requirements for improvements in automotive fuel efficiency and crash safety have been growing, both automotive weight reduction and shock absorption properties have been needed. In addition, requirements for improvements in driving stability and the like are currently growing and therefore further improvements in automotive rigidity are needed. To realize such requirements, a high-strength, high-rigidity design in which gauge reduction of a steel sheet by the use of a high-strength steel sheet is combined with application of a light metal such as an aluminium alloy to an automobile body is promoted and, along with that, improvements in the strength and rigidity of joints are being needed.

A resistance welding process typified by spot welding is a joining process which is low-cost and has high production efficiency and therefore is used in various industries including the automobile industry. With the expansion of the above-mentioned needs for improvements in rigidity, a weld bond process using a combination of bonding and spot welding is being increasingly used. This is because changing a joint from those by spot joining to line joining, and further face joining increases the rigidity of members as well as joints.

The weld bond process, as compared to joining by bonding only, has an advantage that a joint improved in impact strength, high-temperature strength, creep resistance and the like can be formed. Furthermore, the weld bond process, as compared to joining by spot welding only, has advantages that fatigue properties, rigidity and the like are improved and corrosion resistance also is improved because sealing properties are imparted to a joint. Because of these advantages, the weld bond process is being increasingly used in steps of manufacturing automobiles.

In the weld bond process, each material to be joined is joined through steps of such as application of an adhesive to a faying surface, lapping, spot welding, and curing an adhesive. Therefore, the materials to be joined are retained with a spot weld only until the adhesive becomes cured. In addition, when the materials to be joined are heated for the purpose of curing the adhesive, thermal stress is induced in a joint because of the difference in thermal expansion coefficient from the material to be joined so that various stresses are applied to the joint until the adhesive is cured. Therefore, joints formed by spot welding need to have strength sufficient to withstand these stresses. Furthermore, the impact strength, high-temperature strength and the like of a weld-bond joint affect the strength of the spot weld and therefore the spot weld needs to have high strength.

The techniques below have been proposed to solve these problems. For example, Japanese Unexamined Patent Application Publication No. 8-118031 proposes a method in which a good nugget is ensured and necessary bond strength is maintained such that a material to be welded is heated to 50° C. to 170° C. prior to the pressing operation of spot welding and then welded. Japanese Unexamined Patent Application Publication No. 8-206845 proposes a method in which conductivity during resistance spot welding is made good, melting failures are prevented, a good nugget is ensured, and sufficient joint strength is obtained by using an adhesive which is a thermosetting epoxy resin containing one or more additives such as conductive powdery, scaly, or flaky metals, metal oxides, metal carbides, metal nitrides, and metal silicides.

However, the method described in JP '031 has a problem that the increase in number of steps causes cost increases because steel sheets need to be heated prior to welding. In the method described in JP '845, although a weld having a stable nugget diameter can be obtained by ensuring conductivity, the reduction in number of welds and the effect of increasing the strength of a weld itself are not obtained because the strength of a weld is equivalent to that of a conventional one.

SUMMARY

We provide an assembly (steel sheet assembly) capable of obtaining sufficient bond strength by increasing the strength of a weld itself even when the bond strength of an adhesive is reduced.

The amount of C in a nugget can be increased by application of an adhesive and a carbon-supplying agent and by appropriately controlling the shape of the tip of an electrode and welding conditions during spot welding. This increases the strength of the nugget to enable the strength of a joint to be increased.

Hitherto, in a weld bond process using spot welding, many investigations have been made focusing on how to discharge an adhesive from a faying surface to obtain a stable nugget diameter. However, in our method, carbon is supplied to a weld by applying an adhesive and a carbon-supplying agent and the discharge of adhesive and the carbon-supplying agent is controlled. This enables a weld to be stably formed and the strength of a joint to be further increased as compared to when mixing of adhesive and carbon-supplying agent is avoided.

We thus provide:

[1] A steel sheet assembly includes a plurality of lapped steel sheets having a composition containing C: 0.4% or less, Si: 3.0% or less, Al: 3.0% or less, Mn: 0.2% to 6.0%, P: 0.1% or less, and S: 0.07% or less on a mass basis, the remainder being Fe and inevitable impurities, and having a tensile strength of 1,470 MPa or less and a thickness of 0.3 mm to 5.0 mm, the steel sheet assembly being formed by applying, in advance, an adhesive and a carbon-supplying agent to a surface of either or both of the steel sheets to be lapped and then welding the steel sheets. A weld of the assembly has a nugget diameter of $2.8\sqrt{t}$ (mm) or more, where t denotes the thickness of a thinner one of the steel sheets on both sides of a weld interface. The amount of C is increased by 0.02% by mass or more as compared to the steel sheets before being applied with the adhesive and the carbon-supplying agent.

[2] In the steel sheet assembly specified in Item [1], the composition further contains one or more selected from Cr: 0.05% to 5.0%, V: 0.005% to 1.0%, Mo: 0.005% to 0.5%, Ni: 0.05% to 2.0%, Cu: 0.05% to 2.0%, Ti: 0.01% to 0.1%, Nb: 0.01% to 0.1%, B: 0.0003% to 0.0050%, Ca: 0.001% to 0.005%, and a REM: 0.001% to 0.005% on a mass basis.

[3] In the steel sheet assembly specified in Item [1] or [2], the carbon-supplying agent is mixed in the adhesive in advance.

[4] In the steel sheet assembly specified in any one of Items [1] to [3], the hardness of the formed weld is higher than that of the steel sheets before being applied with the adhesive and the carbon-supplying agent by 20 or more in terms of Vickers hardness.

[5] A method of manufacturing a steel sheet assembly includes: applying, in advance, an adhesive and a carbon-supplying agent to a surface of either or both steel sheets to be lapped, the steel sheets having a composition containing C: 0.4% or less, Si: 3.0% or less, Al: 3.0% or less, Mn: 0.2% to 6.0%, P: 0.1% or less, and S: 0.07% or less on a mass basis, the remainder being Fe and inevitable impurities, and having a tensile strength of 1,470 MPa or less and a thickness of 0.3 mm to 5.0 mm; lapping the steel sheets; and then welding the steel sheets. A weld of the assembly has a nugget diameter of $2.8\sqrt{t}$ (mm) or more, where t denotes the thickness of a thinner one of the steel sheets on both sides of a weld interface. The amount of C is increased by 0.02% by mass or more as compared to the steel sheets before being applied with the adhesive and the carbon-supplying agent.

[6] In the method of manufacturing the steel sheet assembly specified in Item [5], the composition further contains one or more selected from Cr: 0.05% to 5.0%, V: 0.005% to 1.0%, Mo: 0.005% to 0.5%, Ni: 0.05% to 2.0%, Cu: 0.05% to 2.0%, Ti: 0.01% to 0.1%, Nb: 0.01% to 0.1%, B: 0.0003% to 0.0050%, Ca: 0.001% to 0.005%, and a REM: 0.001% to 0.005% on a mass basis.

[7] In the method of manufacturing the steel sheet assembly specified in Item [5] or [6], the carbon-supplying agent is mixed in the adhesive in advance.

[8] In the method of manufacturing the steel sheet assembly specified in any one of Items [5] to [7], the hardness of the formed weld is higher than that of the steel sheets before being applied with the adhesive and the carbon-supplying agent by 20 or more in terms of Vickers hardness.

[9] A welding process used in the method of manufacturing the steel sheet assembly specified in any one of Items [5] to [8] is a spot welding process performed for a heat time of 0.08 seconds or more using a convex electrode with a tip radius of curvature of 20 mm or more or a flat electrode such that the weld force F (kN) for initial 0.03 seconds of the heat time satisfies the following relational formula:

$$F<0.00125 \times TS \times (1+0.75 \times t_{all})+3$$

where TS (MPa) denotes the average strength of the steel sheets and represents the weighted mean value of the thickness of each steel sheet, and $t_{all}$ denotes the total thickness of the steel sheets (the sum of the thicknesses of the steel sheets).

The strength of a weld can be ensured by adding an appropriate amount of carbon to the weld even in such a state that strength due to bonding cannot be sufficiently obtained prior to adhesive curing in a manufacturing process of an assembly. Furthermore, the necessary strength of a structure can be maintained by the strength of the weld even in the case where the strength of the assembly in use and the bond strength of the adhesive are reduced by temporal changes.

DETAILED DESCRIPTION

Examples are described below.

The strength of a weld is increased by supplying carbon to the weld through application of an adhesive and a carbon-supplying agent to a faying surface. A means of supplying carbon is not particularly limited. However, since the carbon-supplying agent is supplied to a melted portion, in a pressing step and a subsequent heating step in spot welding, the spot welding needs to be performed without completely discharging the adhesive from a melted portion-forming range, so as the adhesive and the carbon-supplying agent to be incorporated within the melted portion when the melted portion is grown.

Therefore, not only simply applying the adhesive and the carbon-supplying agent, but also incorporating an appropriate amount of carbon in the melted portion with a weld stably formed is important.

Our steel sheets are described below.

Components of Steel Sheets

The steel sheet components need to contain C: 0.4% or less, Si: 3.0% or less, Al: 3.0% or less, Mn: 0.2% to 6.0%, P: 0.1% or less, and S: 0.07% or less on a mass basis, the remainder being Fe and inevitable impurities. In descriptions below, the unit "%" used to express the content of each component refers to "mass percent."

C: 0.4% or Less

When the C content of each steel sheet is more than 0.4%, the weld becomes brittle and it is difficult to ensure the strength thereof in some cases. Therefore, the C content of the steel sheet is 0.4% or less. The C content of the steel sheet is preferably 0.3% or less and more preferably 0.25% or less.

Si: 3.0% or Less

Si is a useful element contributing to increasing the strength of steel by solid solution strengthening. However, when the Si content is more than 3.0%, deterioration of toughness is caused by the increase in the amount of solid solute Si. Thus, the Si content is 3.0% or less. The Si content is preferably 2.6% or less and more preferably 2.2% or less. The lower limit of Si is not particularly limited. Si is an element effective in suppressing the formation of carbides and is useful in increasing the strength due to the increase in amount of C in a melted portion. Therefore, the Si content is preferably 0.02% or more and more preferably 0.1% or more.

Al: 3.0% or Less

Al is an element effective in controlling the fraction of a microstructure. However, containing more than 3.0% increases the number of inclusions in the steel sheet to deteriorate the ductility. Thus, the content is 3.0% or less. The content is preferably 2.5% or less and more preferably 1.5% or less. The lower limit of the Al content is not particularly regulated, however, the reduction thereof is costly. Therefore, the Al content is preferably 0.01% or more and more preferably 0.02% or more.

Mn: 0.2% to 6.0%

Mn is an element effective in strengthening steel and necessary to strengthen the weld and the melted portion. When the Mn content is less than 0.2%, such effects are not obtained. Therefore, the Mn content is 0.2% or more. The Mn content is preferably 0.5% or more and more preferably 0.8% or more. However, when the Mn content is more than 6.0%, cracking occurs from solidification interfaces or grain boundaries during solidification and cooling in some cases. Therefore, the Mn content is 6.0% or less. The Mn content is preferably 5.2% or less and more preferably 4.7% or less.

P: 0.1% or Less

P is an element useful in strengthening steel. When the P content is more than 0.1%, P segregates at solidification interfaces or the like to cause embrittlement and deteriorates the crashworthiness. Therefore, the effect of strengthening the weld by the increase in the amount of P as in that of C is not obtained. Therefore, the P content is 0.1% or less. The P content is preferably 0.05% or less. The P content is preferably minimized. However, reducing the P content to less than 0.005% causes a significant increase in cost. Therefore, the lower limit thereof is preferably about 0.005%.

S: 0.07% or Less

S forms MnS to serve as an inclusion and causes the deterioration of crashworthiness. Therefore, the S content is preferably minimized. However, the excessive reduction of the S content causes an increase in manufacturing cost. Therefore, the S content is 0.07% or less. The S content is preferably 0.05% or less and more preferably 0.02% or less. Incidentally, adjusting the S content to less than 0.0005% causes a large increase in manufacturing cost in a desulfurization step. Therefore, from the viewpoint of manufacturing cost, the lower limit of the S content is about 0.0005%.

N: 0.020% or Less

N is an element most significantly deteriorating the aging resistance of the steel sheet and the content is preferably reduced. When the N content is more than 0.020%, the deterioration of the aging resistance is significant. Therefore, the N content is preferably 0.020% or less. Incidentally, adjusting the N content to less than 0.001% causes a large increase in manufacturing cost. Therefore, from the viewpoint of manufacturing cost, the lower limit of the N content is about 0.001%.

In the steel sheet, components other than the above are Fe and inevitable impurities. Containing components other than the above, necessary to improve other properties is not refused unless the desired effects are impaired.

For example, Cr, V, Mo, Ni, and Cu may be added for the purpose of controlling the transformation of a second phase during cooling to control hardenability. Ti, Nb, B, and the like may be added for the purpose of controlling the precipitation behavior of carbides and nitrides in consideration of using precipitation hardening and the like. Furthermore, Ca and a REM may be added for the purpose of improving a negative influence of sulfides on the stretch-flange formability by spheroidizing sulfides.

The additive amount (content) of each element is preferably as follows: Cr: 0.05% to 5.0%, V: 0.005% to 1.0%, Mo: 0.005% to 0.5%, Ni: 0.05% to 2.0%, Cu: 0.05% to 2.0%, Ti: 0.01% to 0.1%, Nb: 0.01% to 0.1%, B: 0.0003% to 0.0050%, Ca: 0.001% to 0.005%, and the REM: 0.001% to 0.005%. If the content of each element is below the lower limit of the above range the desired effects are not impaired. Therefore, even when the content of the element is less than the lower limit, the element is regarded as an inevitable impurity.

Properties of Steel Sheets

In a steel sheet with a tensile strength of more than 1,470 MPa, the effect of strengthening the weld by adding C to the melted portion cannot be sufficiently obtained because the steel sheet has high strength. Therefore, the strength of the steel sheets is 1,470 MPa or less in terms of tensile strength.

The steel sheets intended by a joining method include those having a surface galvanized, galvannealed, or electroplated with Zn, Al, Mg, or an alloy thereof and further chromate-treated or coated with a resin film.

Two or more of the steel sheets described above are lapped and the adhesive and the carbon-supplying agent are applied thereto, followed by welding. The thickness of each steel sheet is not particularly limited by the joining method and is usually 0.3 mm to 5.0 mm from the viewpoint of practical use. When the thickness thereof is less than 0.3 mm, it is difficult to ensure the strength of a member. A steel sheet with a thickness of more than 5.0 mm is rarely used in automobile bodies and is joined by a method other than resistance spot welding and weld bonding in general.

Adhesive

The adhesive may be applied to a faying surface of either one of the two steel sheets to be lapped or faying surfaces of both of the steel sheets. The adhesive may be one such as an epoxy resin-based adhesive obtained by blending an epoxy resin widely used in the field of automotive and the like with a curing agent, filler, a modifier or the like, a modified acrylic adhesive, or a polyurethane-based adhesive, the type and components of the adhesive are not particularly limited as far as the required properties are satisfied. In the adhesive used, the components and the blending ratio thereof may be appropriately selected depending on required properties such as bond strength, durability, and cost.

The spread of the adhesive may be arbitrarily selected depending on properties required of a faying surface and the weld. However, when the spread is too large, it is difficult to control formation of a nugget. Therefore, the spread is preferably 1.0 mm or less in terms of thickness and more preferably 0.5 mm or less. In contrast, when the spread is excessively small, there is a problem in that not only it is difficult to incorporate a necessary component in the melted portion but also the possibility of causing a region not applied with the adhesive is high because it is difficult to uniformly apply the adhesive. Therefore, the spread is preferably 0.01 mm or more and more preferably 0.03 mm or more.

Carbon-Supplying Agent

The carbon-supplying agent used may be a graphite powder or carbon black. The carbon-supplying agent may be provided on the adhesive applied to a surface of each steel sheet. Alternatively, a prepared mixture of the graphite powder and the adhesive as described above may be applied to the steel sheet. The amount of the carbon-supplying agent used is not particularly limited and may be determined such that the increase in amount of C is within an appropriate range as described below. A measure of the amount of the carbon-supplying agent used is 2 mass parts to 30 mass parts per 100 mass parts of the adhesive.

Welding Conditions

Welding conditions are described below. To stably obtain an assembly, it is necessary that a convex electrode with a tip radius of curvature of 20 mm or more or a flat electrode is used during spot welding, welding is performed for a heat time of 0.08 seconds or more, and the weld force F (kN) for initial 0.03 seconds satisfies relational formula:

$$F < 0.00125 \times TS \times (1 + 0.75 \times t_{all}) + 3$$

where TS (MPa) denotes the average strength of the steel sheets and is the weighted mean value of the thickness of each steel sheet and $t_{all}$ (mm) denotes the total thickness of the steel sheets (the sum of the thicknesses of the steel sheets).

For convex electrodes with a tip radius of curvature of less than 20 mm, a sufficient effect is not obtained in some cases because the discharge of the adhesive and the carbon-supplying agent proceeds excessively during pressing and therefore the incorporation of carbon in the melted portion is insufficient. To stably form the melted portion, the balance between the welding current and the heat time is important and the welding current needs to be increased when the heat time is short.

When the heat time is less than 0.08 seconds, it is difficult to stably form a sufficient-size melted portion even if the welding current is increased, because expulsion occurs before the formation of the sufficient melted portion. Furthermore, even when the heat time is 0.08 seconds or more, when the weld force for initial 0.03 seconds does not satisfy the above relational formula, it is difficult to sufficiently add carbon to the melted portion because the discharge of the adhesive and the carbon-supplying agent proceeds significantly in an initial heat period, and therefore it is difficult to obtain the specified weld in some cases.

Conditions to cure the adhesive after spot welding may be selected on the basis of curing properties of the adhesive. In the case of, for example, a thermosetting adhesive, a necessary heat treatment may be performed by charging welded members into a high-frequency heater or a furnace. In this curing step, the adhesive may be cured in association with heating during painting when bake painting is performed in a step after welding.

A spot welding machine may be any type of welding machine such as a stationary welding machine or a gun-type welding machine as far as not departing from the gist of the present invention. A welding power supply can be selected from a single-phase alternating current power supply, a direct-current power supply, a three-phase rectifier-type power supply, a capacitor-type power supply and the like.

Furthermore, the following method may be used: a control method in which the resistance, the voltage and the like are monitored during welding and the current or the heat time is varied depending on the change thereof.

Nugget Diameter of Assembly

The nugget diameter being 2.8√t (mm) or more with respect to the thickness t of a thinner one of the steel sheets on both sides of a weld interface Our methods are characterized in that the strength of the joint is increased by hardening the weld. However, when the nugget diameter is less than 2.8√t (mm), an interface failure occurs and therefore sufficient joint strength cannot be ensured even though the weld is hardened. Therefore, the nugget diameter is set to 2.8√t (mm) or more [t: the thickness of a thinner one of the steel sheets on both sides of a weld interface]. The nugget diameter is preferably is 3.5√t (mm) or more. The upper limit of the nugget diameter is not particularly limited, however, the upper limit is preferably 1.2 times or less the tip diameter of an electrode in consideration of the stability of occurrence of expulsion. A method described in an example is used to measure the nugget diameter.

Amount of C and hardness in melted portion of assembly

Amount of C in melted portion: increase by 0.02% by mass or more

Hardness of weld: hardening to a Vickers hardness of 20 or more

The weld is hardened by supplying carbon to the weld such that the strength of the joint is increased. This effect is obtained by increasing the increment of carbon in the weld by 0.02% by mass or more. The increment is preferably 0.03% by mass or more. On the other hand, the increment of carbon is preferably 1.3% by mass or less because the weld becomes brittle in the case of extremely increasing the increment of carbon. A method described in an example is used to measure the increment of carbon.

The hardening value (the increment of hardness) of the weld along with the increment of C is preferably 20 or more in terms of Vickers hardness and more preferably 30 or more. The upper limit of the increment of Vickers hardness is not particularly limited, however, the increment is preferably 800 or less because of the suppression of significant embrittlement.

EXAMPLES

Our assemblies, methods and processes are further described below in detail with reference to examples. The examples are not intended to limit this disclosure and are included in the technical scope of the disclosure.

An adhesive and a carbon-supplying agent were applied to various steel sheets, containing components shown in Table 1, having a tensile strength of about 270 MPa, 590 MPa, or 980 MPa except Sample Nos. 2 and 4 shown in Table 2 (Tables 2-1 and 2-2 are collectively referred to as Table 2), and the steel sheets were followed by spot welding under predetermined conditions. Sample No. 2 was welded without applying an adhesive and a carbon-supplying agent. Sample No. 4 is an example in which no carbon-supplying agent was mixed with an adhesive. For a shape described in the item "Electrode", DR refers to a dome radius shape and CF refers to a frusto-conical shape (in accordance with JIS C 9305).

TABLE 1

| | Component (mass percent) | | | | | | | |
|---|---|---|---|---|---|---|---|---|
| Steel type | C | Si | Mn | P | S | Al | N | Cr |
| 270 MPa-class cold-rolled steel sheet | 0.03 | 0.01 | 0.2 | 0.01 | 0.002 | 0.03 | 0.003 | 0.01 |
| 590 MPa-class cold-rolled steel sheet | 0.08 | 0.3 | 1.5 | 0.02 | 0.002 | 0.03 | 0.004 | 0.02 |
| 590 MPa-class GA steel sheet | 0.10 | 0.1 | 1.7 | 0.01 | 0.002 | 0.03 | 0.004 | 0.20 |
| 980 MPa-class cold-rolled steel sheet | 0.12 | 1.2 | 1.9 | 0.02 | 0.003 | 0.04 | 0.003 | 0.02 |
| 980 MPa-class GA steel sheet | 0.14 | 0.1 | 2.4 | 0.01 | 0.001 | 0.70 | 0.004 | 0.02 |

Results are shown in Table 2.

TABLE 2-1

| Sample No | Combination of sheets: tensile strength (MPa) · steel type (sheet thickness (mm)) | Adhesive | Electrode Shape | Tip diameter (mm) | Tip radius of curvature (mm) | Welding conditions | Remarks |
|---|---|---|---|---|---|---|---|
| 1 | 980 cold-rolled (1.0) - 980 cold-rolled (1.0) | Epoxy-based and graphite powder | DR | 6.0 | 40 | Weld force: 5 kN - welding current: 5.5 kA - heat time: 15 cyc/50 Hz | Example |
| 2 | 980 cold-rolled (1.0) - 980 cold-rolled (1.0) | Not used | DR | 6.0 | 40 | Weld force: 5 kN - welding current: 5.5 kA - heat time: 15 cyc/50 Hz | Comparative Example |
| 3 | 980 cold-rolled (1.0) - 980 cold-rolled (1.0) | Carbon-containing epoxy-based | DR | 6.0 | 30 | Weld force: 5 kN - welding current: 6.5 kA - heat time: 15 cyc/50 Hz | Example |
| 4 | 980 cold-rolled (1.0) - 980 cold-rolled (1.0) | Epoxy-based | DR | 6.0 | 40 | Weld force: 5 kN - welding current: 6.5 kA - heat time: 15 cyc/50 Hz | Comparative Example |
| 5 | 980 cold-rolled (1.0) - 980 cold-rolled (1.0) | Carbon-containing epoxy-based | DR | 8.0 | 40 | Weld force: 3 kN - welding current: 3.0 kA - heat time: 5 cyc/50 Hz and Weld force: 6 kN - welding current: 6.0 kA - heat time: 10 cyc/50 Hz | Example |
| 6 | 980 cold-rolled (1.0) - 980 cold-rolled (1.0) | Carbon-containing epoxy-based | DR | 6.0 | 40 | Weld force: 7 kN - welding current: 7.0 kA - heat time: 15 cyc/50 Hz | Comparative Example |
| 7 | 980GA(1.0)-980GA(1.0) | Epoxy-based and graphite powder | DR | 8.0 | 80 | Weld force: 4 kN - welding current: 3.0 kA - heat time: 5 cyc/50 Hz and Weld force: 7 kN - welding current: 6.5 kA - heat time: 10 cyc/50 Hz | Example |
| 8 | 980 cold-rolled (1.0) - 980 cold-rolled (1.0) | Carbon-containing epoxy-based | DR | 8.0 | 40 | Weld force: 6 kN - welding current: 7 kA - heat time: 3 cyc/50 Hz | Comparative Example |
| 9 | 980 cold-rolled (1.0) - 980 cold-rolled (1.0) | Carbon-containing epoxy-based | DR | 8.0 | 8 | Weld force: 5 kN - welding current: 6.2 kA - heat time: 15 cyc/50 Hz | Comparative Example |
| 10 | 980 cold-rolled (1.0) - 980 cold-rolled (1.0) | Carbon-containing epoxy-based | CF | 6.0 | Flat | Weld force: 5 kN - welding current: 5.5 kA - heat time: 25 cyc/50 Hz | Example |
| 11 | 980 cold-rolled (1.4) - 980 cold-rolled (1.4) | Carbon-containing epoxy-based | DR | 6.0 | 120 | Weld force: 5 kN - welding current: 7.0 kA - heat time: 15 cyc/50 Hz | Example |
| 12 | 590 cold-rolled (1.6) - 590 cold-rolled (1.6) | Epoxy-based and graphite powder | DR | 6.0 | 40 | Weld force: 3 kN - welding current: .8 kA - heat time: 15 cyc/50 Hz | Example |
| 13 | 590GA(1.6)-590GA(1.6) | Carbon-containing epoxy-based | DR | 8.0 | 60 | Weld force: 5 kN - welding current: 8 kA - heat time: 12 cyc/50 Hz | Example |
| 14 | 270 cold-rolled (0.7) - 270 cold-rolled (0.7) | Carbon-containing epoxy-based | DR | 8.0 | 60 | Weld force: 1.5 kN - welding current: 8 kA - heat time: 5 cyc/50 Hz | Example |
| 15 | 270 cold-rolled (0.7) - 270 cold-rolled (0.7) | Carbon-containing epoxy-based | DR | 8.0 | 60 | Weld force: 2 kN - welding current: 7.5 kA - heat time: 5 cyc/50 Hz | Example |

TABLE 2-2

| Sample No. | $0.00125 \times TS \times (1 + 0.75 \times t_{all}) + 3$ | Nugget diameter (mm) | Increment of carbon in weld (mass percent) | Difference in hardness from the case of applying no adhesive (HV) | Tensile shear strength (kN) | Failure mode | Remarks |
|---|---|---|---|---|---|---|---|
| 1 | 6.1 | 4.1 | 0.059 | 69 | 16.1 | Plug failure | Example |
| 2 | 6.1 | 4.1 | — | — | 9.8 | Interface failure | Comparative Example |
| 3 | 6.1 | 4.2 | 0.069 | 81 | 16.8 | Plug failure | Example |
| 4 | 6.1 | 4.2 | 0.002 | 2 | 11.1 | Interface failure | Comparative Example |
| 5 | 6.1 | 4.5 | 0.047 | 55 | 17.8 | Plug failure | Example |
| 6 | 6.1 | 4.4 | 0.014 | 17 | 11.7 | Interface failure | Comparative Example |
| 7 | 6.1 | 4.6 | 0.041 | 48 | 18.1 | Plug failure | Example |
| 8 | 6.1 | 2.5 | 0.026 | 31 | 3.9 | Interface failure | Comparative Example |
| 9 | 6.1 | 3.9 | 0.010 | 12 | 10.9 | Partial plug | Comparative Example |
| 10 | 6.1 | 4.5 | 0.059 | 71 | 18.5 | Plug failure | Example |
| 11 | 6.8 | 5.9 | 0.037 | 43 | 21.9 | Plug failure | Example |
| 12 | 5.5 | 5.0 | 0.045 | 53 | 16.0 | Plug failure | Example |
| 13 | 5.5 | 6.3 | 0.024 | 28 | 20.8 | Plug failure | Example |
| 14 | 3.7 | 3.4 | 0.045 | 53 | 2.7 | Plug failure | Example |
| 15 | 3.7 | 4.1 | 0.036 | 42 | 3.2 | Plug failure | Example |

For "Combination of sheets" in Table 2, for example, Sample No. 1 shows that cold-rolled steel sheets having a thickness of 1.0 mm and a tensile strength of 980 MPa class were welded to each other. "GA" in the column of "Combination of sheets" represents a galvannealed steel sheet.

In "Adhesive" in Table 2, the expression "Epoxy-based and graphite powder" means that an adhesive used was an epoxy resin-based adhesive and a carbon-supplying agent used was a graphite powder (after the adhesive was applied to a steel sheet, the carbon-supplying agent was provided on the adhesive). The expression "Carbon-containing epoxy-based" means that an adhesive used was an epoxy resin-based adhesive, a carbon-supplying agent used was carbon black, and carbon black was mixed with the epoxy resin-based adhesive in advance. Furthermore, "Epoxy-based" for No. 4 means that an adhesive used was an epoxy resin-based adhesive and no carbon-supplying agent was applied.

A welding machine used was a direct-current resistance spot welding machine. Welding was performed such that the shape of the tip of each electrode, the weld force, the welding current, and the heat time were varied. After welding, a joint was vertically cut in the center of a weld, a cross section thereof was observed, and the diameter of a nugget was measured. The amount of carbon in the weld was determined in such a manner that five spots in a 200 μm×200 μm region in the nugget were measured using an EPMA and the measurements were averaged. The quality of the joint was evaluated for rupture strength and failure mode by shear tensile testing in accordance with JIS Z 3136. The joint was evaluated depending on the tensile shear strength and the failure mode. In particular, when the failure mode was "plug failure," the strength of a weld was rated sufficient. When the failure mode was "partial plug failure (partial plug in Table 2)" or "interface failure," the strength of a weld was rated insufficient.

The hardness of the weld was evaluated in terms of Vickers hardness. The average of measurements of five spots in the nugget measured under a test load of 300 gf was defined as the hardness of the weld. Results of the increment of hardness were shown in Table 2.

In Nos. 5 and 7 in Table 2, two-step welding was performed and in the others, single-step welding was performed. As is clear from these results, a failure mode during tensile shearing is improved from an interface failure to a plug failure and the strength of each joint is increased.

The invention claimed is:

1. A welding process used in a method of manufacturing a steel sheet assembly comprising: spot welding steel sheets performed for a heat time of 0.08 seconds or more using a convex electrode with a tip radius of curvature of 20 mm or more or a flat electrode such that the weld force F (kN) for initial 0.03 seconds of the heat time satisfies formula:

$$F<0.00125 \times TS \times (1+0.75 \times t_{all})+3$$

where TS (MPa) denotes an average strength of the steel sheets and represents a weighted mean value of a thickness of each of the steel sheets, and tall (mm) denotes a total thickness of the steel sheets.

2. A welding process used in a method of manufacturing a steel sheet assembly that comprises: applying, in advance, an adhesive and a carbon-supplying agent to a surface of either or both of steel sheets to be lapped, the steel sheets having a composition containing:
C: 0.4% or less,
Si: 3.0% or less,
Al: 3.0% or less,
Mn: 0.2% to 6.0%,
P: 0.1% or less,
and S: 0.07% or less on a mass basis,
the remainder being Fe and inevitable impurities, and having a tensile strength of 1,470 MPa or less and a thickness of 0.3 mm to 5.0 mm;
lapping the steel sheets;
and then welding the steel sheets, wherein a weld of the assembly has a nugget diameter of 2.8√t (mm) or more, where t (mm) denotes the thickness of a thinner one of the steel sheets on both sides of a weld interface, and the amount of C is increased by 0.02% by mass or more as compared to the steel sheets before being applied with the adhesive and the carbon-supplying agent, the welding process comprising:
spot welding the steel sheets performed for a heat time of 0.08 seconds or more using a convex electrode with a tip radius of curvature of 20 mm or more or a flat electrode such that the weld force F (kN) for initial 0.03 seconds of the heat time satisfies formula:

$$F<0.00125 \times TS \times (1+0.75 \times t_{all})+3$$

where TS (MPa) denotes an average strength of the steel sheets and represents a weighted mean value of a thickness of each of the steel sheets, and $t_{all}$ (mm) denotes a total thickness of the steel sheets.

3. The welding process according to claim 2, wherein the composition further contains one or more selected from the group consisting of:
Cr: 0.05% to 5.0%,
V: 0.005% to 1.0%,
Mo: 0.005% to 0.5%,
Ni 0.05% to 2.0%,
Cu: 0.05% to 2.0%,
Ti: 0.01% to 0.1%,
Nb: 0.01% to 0.1%,
B: 0.0003% to 0.0050%,
Ca: 0.001% to 0.005%, and
a REM: 0.001% to 0.005%
on a mass basis.

4. The welding process according to claim 2, wherein the carbon-supplying agent is mixed in the adhesive in advance.

5. The welding process according to claim 2, wherein the hardness of the formed weld is higher than that of the steel sheets before being applied with the adhesive and the carbon-supplying agent by 20 or more in terms of Vickers hardness.

6. The welding process according to claim 3, wherein the carbon-supplying agent is mixed in the adhesive in advance.

7. The welding process according to claim 3, wherein the hardness of the formed weld is higher than that of the steel sheets before being applied with the adhesive and the carbon-supplying agent by 20 or more in terms of Vickers hardness.

8. The welding process according to claim 1, wherein the convex electrode with a tip radius of curvature of 20 mm or more or a flat electrode is a convex electrode with a tip radius of curvature of 30 mm or more.

* * * * *